(12) United States Patent
Jin et al.

(10) Patent No.: US 11,767,008 B2
(45) Date of Patent: Sep. 26, 2023

(54) ANTI-ROLLOVER APPARATUS AND CONTROL METHOD FOR HEAVY-DUTY VEHICLES WITH PNEUMATIC BRAKE SYSTEM

(71) Applicant: NANJING UNIVERSITY OF AERONAUTICS AND ASTRONAUTICS, Nanjing (CN)

(72) Inventors: Zhilin Jin, Nanjing (CN); Jingxuan Li, Nanjing (CN); Shuwei Huang, Nanjing (CN); Biao Qian, Nanjing (CN); Yurou Li, Nanjing (CN); Zhining Peng, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 363 days.

(21) Appl. No.: 17/053,517

(22) PCT Filed: Jan. 9, 2020

(86) PCT No.: PCT/CN2020/071073
§ 371 (c)(1),
(2) Date: Apr. 2, 2021

(87) PCT Pub. No.: WO2020/119830
PCT Pub. Date: Jun. 18, 2020

(65) Prior Publication Data
US 2021/0221354 A1    Jul. 22, 2021

(30) Foreign Application Priority Data
Apr. 29, 2019 (CN) .......................... 201910353748.2
Apr. 29, 2019 (CN) .......................... 201920612791.1

(51) Int. Cl.
*B60W 30/04* (2006.01)
*B60R 21/0132* (2006.01)
(Continued)

(52) U.S. Cl.
CPC .......... *B60W 30/04* (2013.01); *B60R 21/0132* (2013.01); *B60T 8/17554* (2013.01);
(Continued)

(58) Field of Classification Search
CPC ........ B60R 2021/01306; B60R 21/032; B62D 37/00; B60W 30/04; B60W 10/184;
(Continued)

(56) References Cited

U.S. PATENT DOCUMENTS 7,580,785 B2 * 8/2009 Matsumoto .......... B62D 15/025
701/41
8,483,911 B2 * 7/2013 Reich .................... B60T 8/1708
180/197
(Continued)

FOREIGN PATENT DOCUMENTS

CN    101913351 A    12/2010
CN    201721441 U    1/2011
(Continued)

OTHER PUBLICATIONS

English Translation of Liang (CN 2925986) filed Jun. 20, 2006 retrieved on May 17, 2023 (Year: 2006).*
(Continued)

*Primary Examiner* — Paul N Dickson
*Assistant Examiner* — Caitlin Anne Miller
(74) *Attorney, Agent, or Firm* — Treasure IP Group, LLC

(57) ABSTRACT

An anti-rollover apparatus and control method for heavy-duty vehicles with a pneumatic brake system includes an anti-yaw module, an anti-roll module, an electronic control unit (ECU) (10), a yaw velocity sensor (12), and a vehicle
(Continued)

roll angle sensor (18). The ECU (10) controls solenoid valves (4, 9, 11, 19, and 24) to achieve braking of part of wheels to obtain anti-yaw torques and improve the yaw stability of the heavy-duty vehicles. The ECU (10) controls gas switch valves (21 and 22) to spray high-pressure gases recovered in brake chambers (1, 13, 16, and 26) out, anti-roll torques are obtained through the jet reactive force, and the roll stability of the heavy-duty vehicles is improved.

3 Claims, 3 Drawing Sheets

(51) Int. Cl.
  *B60T 8/1755* (2006.01)
  *B60W 10/184* (2012.01)
  *B60W 10/30* (2006.01)
  *B62D 37/00* (2006.01)
  *B60R 21/013* (2006.01)
  *B60T 13/68* (2006.01)

(52) U.S. Cl.
  CPC ......... *B60T 13/683* (2013.01); *B60W 10/184* (2013.01); *B60W 10/30* (2013.01); *B62D 37/00* (2013.01); B60R 2021/01306 (2013.01); B60T 2230/03 (2013.01); B60T 2250/03 (2013.01); B60T 2260/09 (2013.01); B60T 2270/88 (2013.01); B60W 2510/182 (2013.01); B60W 2520/14 (2013.01); B60W 2520/18 (2013.01); B60W 2710/182 (2013.01); B60W 2710/30 (2013.01)

(58) Field of Classification Search
  CPC ........... B60W 10/30; B60W 2510/182; B60W 2520/14; B60W 2520/18; B60W 2710/182; B60W 2710/30; B60T 8/17554; B60T 2230/03; B60T 2250/03
  USPC ....................................................... 180/282
  See application file for complete search history.

(56) References Cited

U.S. PATENT DOCUMENTS

| | | | |
|---|---|---|---|
| 8,924,116 B2 * | 12/2014 | Yamada | B60T 8/17554 701/72 |
| 8,935,048 B2 | 1/2015 | Sun | |
| 9,283,825 B2 * | 3/2016 | Mousa | B60G 17/01908 |
| 10,328,916 B2 * | 6/2019 | Miyata | B60T 8/17554 |
| 2015/0239409 A1 | 8/2015 | Mousa | |
| 2021/0394728 A1 * | 12/2021 | Yoo | B60T 13/662 |

FOREIGN PATENT DOCUMENTS

| | | |
|---|---|---|
| CN | 105946991 | 9/2016 |
| CN | 2925986 Y | 12/2016 |
| CN | 205769661 U | 12/2016 |
| CN | 206623830 U | 11/2017 |
| CN | 207225292 U | 4/2018 |
| CN | 108639164 | 10/2018 |
| CN | 108639167 | 10/2018 |
| CN | 109263592 A | 1/2019 |
| CN | 110027633 A | 7/2019 |
| EP | 2065263 | 1/2011 |
| WO | 2015028973 | 3/2015 |

OTHER PUBLICATIONS

Liu, et al. Integrated chassis control for a three-axle electric bus with distributed driving motors and active rear steering system, Vehicle System Dynamics, 55:5, 601-625, 2018.

Chen et al. Differential-Braking-Based Rollover Prevention for Sport Utility Vehicles with Human-in-the-loop Evaluations, Vehicle System Dynamics, vol. 36, No. 4-5, Nov. 2001, pp. 359-389 2001.

* cited by examiner

ANTI-ROLLOVER APPARATUS AND CONTROL METHOD FOR HEAVY-DUTY VEHICLES WITH PNEUMATIC BRAKE SYSTEM

CROSS REFERENCE TO RELATED APPLICATION

This application claims priority to a PCT application PCT/CN2020/071073, filed on Jan. 9, 2020, which in turn takes priority of Chinese Application No. 201910353748.2, filed on Apr. 29, 2019 and 201920612791.1, filed on Apr. 29, 2019. Both the PCT application and Chinese Application are incorporated herein by reference in their entireties.

TECHNICAL FIELD

The present invention relates to the active safety field of heavy-duty vehicle running, in particular to an anti-rollover apparatus and control method for heavy-duty vehicles with a pneumatic brake system.

BACKGROUND ART

Automobile rollover is a very serious traffic accident, which has attracted more and more attention in recent years. Automobile rollover accounts for a small proportion of traffic accidents, but it causes a high rate of death and injury and causes huge losses, ranking second only to automobile collision accidents. Among them, heavy-duty vehicles are more prone to rollover due to their high center of gravity and large mass. Therefore, the present invention proposes a pneumatic-brake-based anti-rollover device and method for heavy-duty vehicles.

At present, there are also many anti-rollover devices for automobiles. Among them, Yajie Jing proposed an anti-rollover emergency safety device and method for automobiles (Publication Number: CN206623830U). In this device, two sets of telescopic support mechanisms are arranged on the left and right sides of a vehicle chassis, respectively as the emergency safety device when an automobile rolls over to the left or right side. This device is simple in structure, safe, reliable, and highly intelligent. However, energy of the device is provided by an additional power source, a lot of energy is consumed and the anti-rollover effect is unstable. Linxuan He proposed a double-gyro-stabilizer-based anti-rollover device and method for automobiles (Publication Number: CN108639164A). When an automobile is in danger of rolling over, this device can sound the alarm to a driver via an alarm, and meanwhile control a first gyro stabilizer module and a second gyro stabilizer module to operate, and an anti-rollover torque is output to achieve emergency protection for passengers in the automobile. The defects that an existing anti-rollover device is complex in structure, low in response speed and incapable of effectively providing an enough aligning torque are overcome, and the active anti-rollover capacity of the automobile is improved. However, this device is high in cost and high in energy consumption. Xiaotong Lu proposed an anti-rollover device for automobiles (Publication Number: CN108639167A). In this device, through cooperation of supporting rods, a fixing block and a jacking rod, under the effect of a buffering piece, the supporting rods and the fixing block are mutually connected and move along with the jacking rod, and thus the stability of the fixing block is improved, and the service life of the fixing block is prolonged; and under the effect of idler wheels, the two sides of the automobile body can be supported by the idler wheels, the safety of the automobile body is improved. However, the device is complex in structure and inconvenient to install.

VILLA Pasquale proposed an anti-rollover device for forklifts (Publication Number: WO2015028973A2). In this device, supporting rods are arranged on both sides of the forklift body. When the forklift is running safely, the supporting rods are fixed to the body in a direction perpendicular to the ground. When the forklift is in danger of rolling over, the supporting rod pops out to sideways to maintain a certain angle with the body. The supporting rod contacts the ground, which effectively protects the forklift and a driver. However, the application of the device is limited to small vehicles, and it is difficult to apply to large vehicles. Yuliang Sun proposed a multi-functional vehicle-rollover judgment system and an automatic anti-rollover device (Publication Number: U.S. Pat. No. 8,935,048B2). In this patent, displacement sensors are installed at four shock absorbers of a vehicle to calculate left and right loads, and the difference between the left and right loads is compared to determine the risk of rollover of the vehicle. Supporting rods and supporting wheels additionally installed in the middle of a vehicle chassis extend in a rollover direction when the difference between the left and right loads reaches a critical value, so as to support and prevent the body of the vehicle from rolling over. However, this device is relatively high in cost and difficult to install, so this device is not suitable for popularization and application. Isam Mousa proposed an anti-rollover device with additional lateral wheels for commercial vehicles (Publication Number: US20150239409A1). In this patent, multiple sets of auxiliary wheels that are perpendicular to the ground when stored are arranged behind the truck racks. When the vehicle is in danger of rolling over, a hydraulic mechanism connected via the auxiliary wheels extend the auxiliary wheels in a rollover direction to the side below, the auxiliary wheels contact the ground to prevent the vehicle from rolling over. This patent has a wide range of applications and can be applied to various types of commercial vehicles. However, this device greatly increases the mass of the vehicle, and meanwhile increases the center of gravity of the vehicle, which has a negative impact on the running stability of the vehicle. Michael R Schramm proposed a dynamically adjustable steering limiting device (Publication Number: U.S. Ser. No. 10/259,494B2). This patent can limit the large-angle steering of a steering wheel when a vehicle runs at a speed higher than a predetermined speed to prevent rollover, and does not limit the steering angle of the steering wheel when the vehicle runs at a low speed, thereby reducing the probability of rollover at a high speed. However, this device achieves an anti-rollover effect by limiting the steering angle of the steering angle, which may interfere with the driver's driving intention, and the anti-rollover capacity is limited.

Bo-Chivan Chen and Huei Peng (Differential-Braking-Based Rollover Prevention for Sport Utility Vehicles with Human-in-the-loop Evaluations, Vehicle System Dynamics, 2001) verified that the designed controller for differential braking can effectively reduce roll and prevent rollover through software simulation and hardware-in-the-loop experiments. However, subject to the calculation time of rollover warning, this document only adopts a simple three-degree-of-freedom rollover model for simulation and hardware experiments, which does not involve practical applications. Van Tan Vu (Enhancing roll stability of heavy vehicle by LQR active anti-roll bar control using electronic servo-valve hydraulic actuators, Vehicle System Dynamics, 2017) uses active hydraulic anti-roll bars and adopts the LQR method to solve the optimal control problem. Roll of a heavy-duty vehicle is well reduced, and rollover is prevented. The test results have a better effect than passive anti-roll bars. However, the active hydraulic anti-roll bars are higher in cost and are still difficult to apply in a large scale. Haitao Ding, Amir Khajepour and Yanjun Huang (A novel tripped rollover prevention system for commercial trucks with air suspensions at low speeds, Proceedings of the Institution of Mechanical Engineers, 2018) proposed a novel anti-rollover system for trucks with air suspensions, focusing on tripped rollover. The feasibility of the system is verified by the joint simulation of Trucksim and simulink. However, air springs of the device will be impacted by the mass transfer of the body during adjustment, which has a certain impact on the durability of the air springs. Wei Liu (Integrated chassis control for a three-axle electric bus with distributed driving motors and active rear steering system, Vehicle System Dynamics, 2018) applies the distributed motor drive and active rear-wheel steering system to a three-axis electric bus. An axis torque distribution controller is designed to optimize the axis torque distribution. Joint simulation of Trucksim and simulink is used for testing. Test results show that good lateral stability and anti-rollover performance are achieved under severe steering conditions. However, the distributed motor drive and active rear-wheel steering system of this device is complex in structure and high in cost, and there is a certain difficulty in layout.

SUMMARY OF THE INVENTION

The present invention aims to solve the technical problems that the existing anti-rollover device for heavy-duty vehicles is complex in structure, poor in anti-rollover effect, high in installation cost, etc., and provides an anti-rollover apparatus and control method for heavy-duty vehicles with a pneumatic brake system. The anti-rollover device is compact in structure, reliable in work, and easy to install, and has a good anti-rollover effect, energy is saved, and the running safety of automobiles is ensured.

The present invention adopts the following technical solutions to solve the above technical problems:

An anti-rollover apparatus for heavy-duty vehicles with a pneumatic brake system includes an anti-yaw module, an anti-roll module, an electronic control unit (ECU), a yaw velocity sensor, and a vehicle roll angle sensor.

The anti-yaw module includes a primary air reservoir, a brake valve, a linear actuator, a relay valve, an air compressor, and first to fourth brake units.

The first to fourth brake units are arranged at front left, front right, rear left, and rear right wheels of the heavy-duty vehicle, respectively, and each includes a switch solenoid valve and a brake chamber. The brake chamber is configured to brake a wheel at a location of the brake chamber.

The brake chambers of the first and second brake units are connected to an output end of a lower cavity of the brake valve via pipes. The switch solenoid valves of the first and second brake units are arranged in pipes between the brake chambers of the first and second brake units and the output end of the lower cavity of the brake valve, respectively, and are configured to control connection and disconnection of the pipes between the brake chambers of the first and second brake units and the lower cavity of the brake valve.

Input ends of an upper cavity and the lower cavity of the brake valve are both connected to an output end of the primary air reservoir via pipes, and an output end of the upper cavity of the brake valve is connected to an input end of the relay valve via a pipe.

An output end of the relay valve is connected to the brake chambers of the third and fourth brake units via pipes, respectively. The switch solenoid valves of the third and fourth brake units are arranged in pipes between the brake chambers of the third and fourth brake units and the output end of the relay valve, respectively, and are configured to control connection and disconnection of the pipes between the brake chambers of the third and fourth brake units and the relay valve, respectively.

An output shaft of the linear actuator abuts against a stem seat of the brake valve, and is configured to push the stem seat of the brake valve so as to open the brake valve when extended. When the output shaft of the linear actuator is retracted, the stem seat of the brake valve is reset and automatically closed under the effect of a return spring of the stem seat.

An output end of the air compressor is connected to an input end of the primary air reservoir via a pipe, and is configured to compress air and then feed the compressed air to the primary air reservoir, so as to enable a pressure of the primary air reservoir to be equal to a preset working pressure threshold.

The anti-roll module includes first to fifth pressure sensors, a secondary air reservoir, a three-position two-way solenoid valve, a bleed nipple, first to second switch valves, and first to second air nozzles.

The first to fifth pressure sensors are arranged in the brake chambers of the first to fourth brake units and the secondary air reservoir, respectively, and are configured to sense pressure values at locations of the pressure sensors and transmit the pressure values to the electronic control unit (ECU).

An input end of the secondary air reservoir is connected to one output end of the three-position two-way solenoid valve via a pipe, and an output end of the secondary air reservoir is connected to the first and second air nozzles via pipes, respectively. The first and second switch valves are arranged in pipes between the secondary air reservoir and the first and second air nozzles, respectively, and are configured to control connection and disconnection of the pipes between the secondary air reservoir and the first and second air nozzles, respectively.

An input end of the three-position two-way solenoid valve is connected to the brake chambers of the first to fourth brake units via pipes, respectively, and the other output end of the three-position two-way solenoid valve is connected to the bleed nipple via a pipe.

The first and second air nozzles are arranged in the middle of a frame on a located side of the first and second brake units of the heavy-duty vehicle, respectively, and are configured to spray air to the outer side of the heavy-duty vehicle. The bleed nipple is configured to discharge gases entering the bleed nipple into the air.

The yaw velocity sensor is configured to detect a yaw velocity of a body of the heavy-duty vehicle and transmit the yaw velocity to the electronic control unit (ECU).

The vehicle roll angle sensor is configured to detect the magnitude of a roll angle of the heavy-duty vehicle, and transmit the magnitude of the roll angle to the electronic control unit (ECU).

The electronic control unit (ECU) is electrically connected to the first to fifth pressure sensors, the switch solenoid valves of the first to fourth brake units, the linear actuator, the three-position two-way solenoid valve, and the first to second switch valves, respectively, and is configured to control the switch solenoid valves of the first to fourth brake units, the linear actuator, the three-position two-way solenoid valve, and the first to second switch valves to operate according to sensing values of the first to fifth pressure sensors.

The present invention further discloses an anti-yaw method of the anti-rollover apparatus for heavy-duty vehicles with a pneumatic brake system, including the following steps:

step A.1), enabling $\omega_1$, $\omega_2$, $\omega_3$, and $\omega_4$ to be preset first, second, third, and fourth yaw velocity thresholds, respectively, and $\omega_1$ and $\omega_2$ to be negative values, wherein $\omega_3=-\omega_2$, $\omega_4=-\omega_1$, and $\omega_4>\omega_3$; and collecting, by the electronic control unit (ECU), a signal $\omega$ of the yaw velocity sensor, and comparing the signal with $\omega_1$, $\omega_2$, $\omega_3$, and $\omega_4$, respectively;

step A.2.1), if $\omega$ is positive and has a value greater than $\omega_3$ and less than $\omega_4$, step A.2.1.1), controlling, by the electronic control unit (ECU), the linear actuator to push the brake valve; and step A.2.1.2), controlling, by the electronic control unit (ECU), the switch solenoid valve of the second brake unit to open, and the switch solenoid valves of the first, third, and fourth brake units to close, wherein a high-pressure gas enters the brake chamber of the second brake unit, the front right wheel is subject to a braking force to generate an anti-yaw torque, and the yaw stability of the heavy-duty vehicle is improved;

step A.2.2), if $\omega$ is positive and has a value greater than $\omega_4$, step A.2.2.1), controlling, by the electronic control unit (ECU), the linear actuator to push the brake valve; and step A.2.2.2), controlling, by the electronic control unit (ECU), the switch solenoid valves of the second and fourth brake units to open, and the switch solenoid valves of the first and third brake units to close, wherein a high-pressure gas enters the brake chambers of the second and fourth brake units, the front right wheel and the rear right wheel are subject to braking forces to generate anti-yaw torques, and the yaw stability of the heavy-duty vehicle is improved;

step A.2.3), if $\omega$ is negative and has a value less than $\omega_2$ and greater than $\omega_1$, step A.2.3.1), controlling, by the electronic control unit (ECU), the linear actuator to push the brake valve; and step A.2.3.2), controlling, by the electronic control unit (ECU), the switch solenoid valve of the first brake unit to open, and the switch solenoid valves of the second, third, and fourth brake units to close, wherein a high-pressure gas enters the brake chamber of the first brake unit, the front left wheel is subject to a braking force to generate an anti-yaw torque, and the yaw stability of the heavy-duty vehicle is improved; and step A.2.4), if $\omega$ is negative and has a value less than $\omega_1$, step A.2.4.1), controlling, by the electronic control unit (ECU), the linear actuator to push the brake valve; and step A.2.4.2), controlling, by the electronic control unit (ECU), the switch solenoid valves of the first and third brake units to open, and the switch solenoid valves of the second and fourth brake units to close, wherein a high-pressure gas enters the brake chambers of the first and third brake units, the front left wheel and the rear left wheel are subject to braking forces to generate anti-yaw torques, and the yaw stability of the heavy-duty vehicle is improved.

The present invention further discloses an anti-roll method of the anti-rollover apparatus for heavy-duty vehicles with a pneumatic brake system, including the following steps:

step B.1), when a brake is released while the heavy-duty vehicle is running, collecting, by the electronic control unit (ECU), pressure values $p_1$, $p_2$, $p_3$, $p_4$, and $p_5$ of the first to fifth pressure sensors, and comparing $p_5$ with $p_1$, $p_2$, $p_3$, and $p_4$, respectively;

step B.1.1), if $p_5$ is less than any one of $p_1$, $p_2$, $p_3$, and $p_4$, controlling, by the electronic control unit (ECU), the three-position two-way solenoid valve to operate, so as to enable the brake chambers of the first to fourth brake units to be communicated with the secondary air reservoir, and enable high-pressure gases in the brake chambers of the first to fourth brake units to enter the secondary air reservoir via the three-position two-way solenoid valve; and step B.1.2), if $p_1$, $p_2$, $p_3$, and $p_4$ are all greater than or equal tops, controlling, by the electronic control unit (ECU), the three-position two-way solenoid valve to operate, so as to enable the brake chambers of the first to fourth brake units to be communicated with the bleed nipple, and enable the high-pressure gases in the brake chambers of the first to fourth brake units to be discharged via the bleed nipple;

step B.2), enabling $\theta_1$ and $\theta_2$ to be preset first and second roll angle thresholds, respectively, wherein $\theta_1$ is a negative value, and $\theta_2=-\theta_1$; and collecting, by the electronic control unit (ECU), a signal $\theta$ of the roll angle sensor, and comparing the signal with $\theta_1$ and $\theta_2$, respectively;

step B.3.1), if $\theta$ is positive and has a value greater than $\theta_2$, step B.3.1.1), controlling, by the electronic control unit (ECU), the second switch valve to open and the first switch valve to close, wherein a high-pressure gas in the secondary air reservoir is sprayed out from the second air nozzle, and a vehicle roll angle is reduced; and step B.3.1.2), when $\theta$ is less than $\theta_2$, controlling, by the electronic control unit (ECU), the second switch valve to close to stop the air spraying; and step B.3.2), if $\theta$ is negative and has a value less than $\theta_1$, step B.3.2.1), controlling, by the electronic control unit (ECU), the first switch valve to open and the second switch valve to close, wherein the high-pressure gas in the secondary air reservoir is sprayed out from the first air nozzle, and the vehicle roll angle is reduced; and step B.3.2.2), when $\theta$ is greater than $\theta_1$, controlling, by the electronic control unit (ECU), the second switch valve to close to stop the air spraying.

Compared with the prior art, the above technical solutions adopted by the present invention have the following technical effects:

1. Simpleness and easiness in installation: The present invention is simple in structure, is based on a pneumatic brake system, is easy to install, and works reliably.
2. Good anti-rollover effect: The present invention can simultaneously improve the yaw stability and the roll stability of the heavy-duty vehicles, and effectively realize the anti-rollover effect of the heavy-duty vehicles.
3. Energy conservation: The residual high-pressure gas from the pneumatic brake is recovered and used in the jet type anti-roll mechanism, and energy is saved.
4. Quick response: With the high-pressure gas as an energy transfer medium, the device is opened and closed quickly and has good real-time performance.

Figure 1:
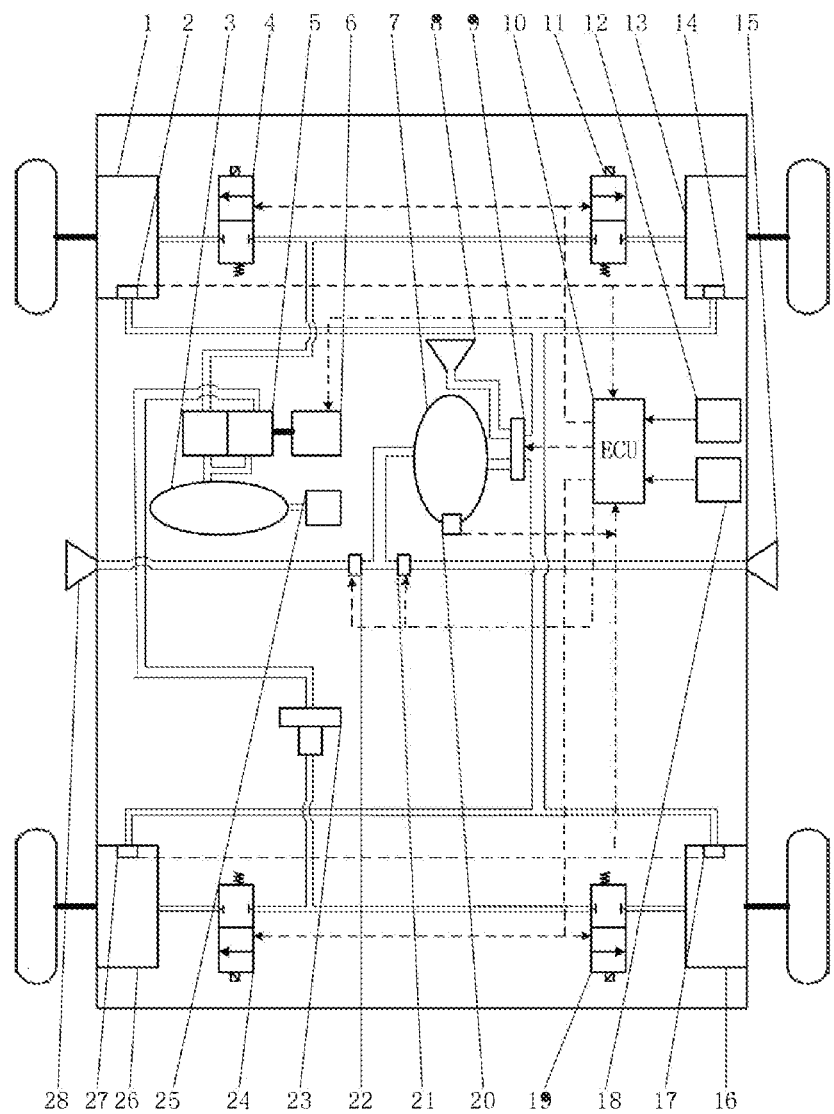
FIG. 1 is a schematic principle diagram of an anti-rollover apparatus for heavy-duty vehicles with a pneumatic brake system of the present invention.

In the drawings, 1 donates a brake chamber of a first brake unit; 2 denotes a first pressure sensor; 3 denotes a primary air reservoir; 4 denotes a switch solenoid valve of the first brake unit; 5 denotes a brake valve; 6 denotes a linear actuator; 7 denotes a secondary air reservoir; 8 denotes a bleed nipple; 9 denotes a three-position two-way solenoid valve; 10 denotes an electronic control unit (ECU); 11 denotes a switch solenoid valve of a second brake unit; 12 denotes a yaw velocity sensor; 13 donates a brake chamber of the second brake unit; 14 denotes a second pressure sensor; 15 denotes a second air nozzle; 16 donates a brake chamber of a fourth brake unit; 17 denotes a fourth pressure sensor; 18 denotes a vehicle roll angle sensor; 19 denotes a switch solenoid valve of the fourth brake unit; 20 denotes a fifth pressure sensor; 21 denotes a second switch valve; 22 denotes a first switch valve; 23 denotes a relay valve; 24 denotes a switch solenoid valve of a third brake unit; 25 denotes an air compressor; 26 donates a brake chamber of the third brake unit; 27 denotes a third pressure sensor; and 28 denotes a first air nozzle.

DETAILED DESCRIPTION OF THE INVENTION

The technical solutions of the present invention will be further described in detail below with reference to the accompanying drawings.

The present invention may be implemented in many different forms and should not be construed as limited to the embodiments set forth herein. Rather, these embodiments are provided so that this disclosure will be thorough and complete, and will fully convey the concept of the present invention to those skilled in the art. In the accompanying drawings, components are amplified for clarity.

As shown in FIG. 1, the present invention discloses an anti-rollover apparatus for heavy-duty vehicles with a pneumatic brake system, including an anti-yaw module, an anti-roll module, an electronic control unit (ECU), a yaw velocity sensor, and a vehicle roll angle sensor.

The anti-yaw module includes a primary air reservoir, a brake valve, a linear actuator, a relay valve, an air compressor, and first to fourth brake units.

The first to fourth brake units are arranged at front left, front right, rear left, and rear right wheels of the heavy-duty vehicle, respectively, and each includes a switch solenoid valve and a brake chamber. The brake chamber is configured to brake a wheel at a location of the brake chamber.

The brake chambers of the first and second brake units are connected to an output end of a lower cavity of the brake valve via pipes. The switch solenoid valves of the first and second brake units are arranged in pipes between the brake chambers of the first and second brake units and the output end of the lower cavity of the brake valve, respectively, and are configured to control connection and disconnection of the pipes between the brake chambers of the first and second brake units and the lower cavity of the brake valve.

Input ends of an upper cavity and the lower cavity of the brake valve are both connected to an output end of the primary air reservoir via pipes, and an output end of the upper cavity of the brake valve is connected to an input end of the relay valve via a pipe.

An output end of the relay valve is connected to the brake chambers of the third and fourth brake units via pipes, respectively. The switch solenoid valves of the third and fourth brake units are arranged in pipes between the brake chambers of the third and fourth brake units and the output end of the relay valve, respectively, and are configured to control connection and disconnection of the pipes between the brake chambers of the third and fourth brake units and the relay valve, respectively.

An output shaft of the linear actuator abuts against a stem seat of the brake valve, and is configured to push the stem seat of the brake valve so as to open the brake valve when extended. When the output shaft of the linear actuator is retracted, the stem seat of the brake valve is reset and automatically closed under the effect of a return spring of the stem seat.

An output end of the air compressor is connected to an input end of the primary air reservoir via a pipe, and is configured to compress air and then feed the compressed air to the primary air reservoir, so as to enable a pressure of the primary air reservoir to be equal to a preset working pressure threshold.

The anti-roll module includes first to fifth pressure sensors, a secondary air reservoir, a three-position two-way solenoid valve, a bleed nipple, first to second switch valves, and first to second air nozzles.

The first to fifth pressure sensors are arranged in the brake chambers of the first to fourth brake units and the secondary air reservoir, respectively, and are configured to sense pressure values at locations of the pressure sensors and transmit the pressure values to the electronic control unit (ECU).

An input end of the secondary air reservoir is connected to one output end of the three-position two-way solenoid valve via a pipe, and an output end of the secondary air reservoir is connected to the first and second air nozzles via pipes, respectively. The first and second switch valves are arranged in pipes between the secondary air reservoir and the first and second air nozzles, respectively, and are configured to control connection and disconnection of the pipes between the secondary air reservoir and the first and second air nozzles, respectively.

An input end of the three-position two-way solenoid valve is connected to the brake chambers of the first to fourth brake units via pipes, respectively, and the other output end of the three-position two-way solenoid valve is connected to the bleed nipple via a pipe.

The first and second air nozzles are arranged in the middle of a frame on a located side of the first and second brake units of the heavy-duty vehicle, respectively, and are configured to spray air to the outer side of the heavy-duty vehicle. The bleed nipple is configured to discharge gases entering the bleed nipple into the air.

The yaw velocity sensor is configured to detect a yaw velocity of a body of the heavy-duty vehicle and transmit the yaw velocity to the electronic control unit (ECU).

The vehicle roll angle sensor is configured to detect the magnitude of a roll angle of the heavy-duty vehicle, and transmit the magnitude of the roll angle to the electronic control unit (ECU).

The electronic control unit (ECU) is electrically connected to the first to fifth pressure sensors, the switch solenoid valves of the first to fourth brake units, the linear actuator, the three-position two-way solenoid valve, and the first to second switch valves, respectively, and is configured to control the switch solenoid valves of the first to fourth brake units, the linear actuator, the three-position two-way solenoid valve, and the first to second switch valves to operate according to sensing values of the first to fifth pressure sensors.

Figure 2:
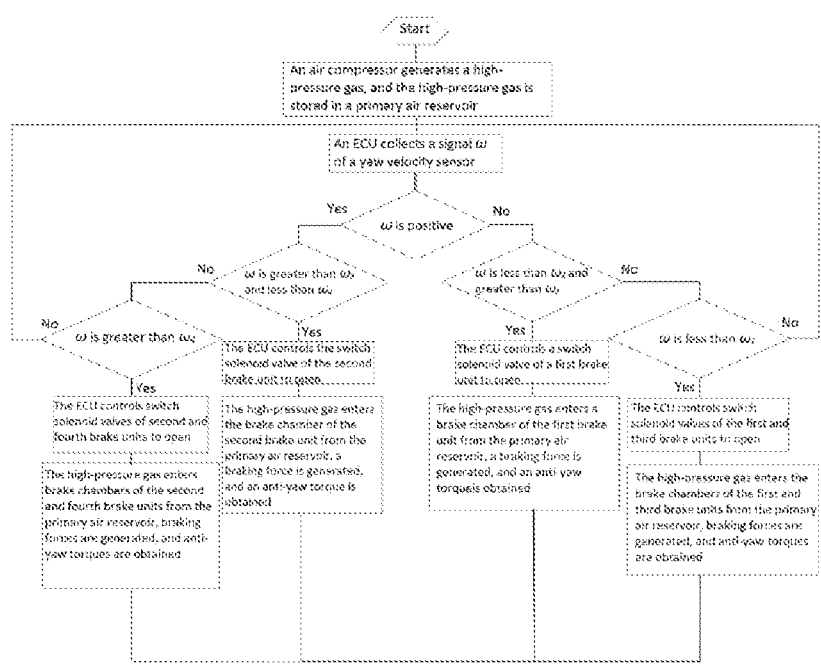
FIG. 2 is a working principle diagram of an anti-yaw module of the present invention.

As shown in FIG. 2, the present invention further discloses an anti-yaw method of the anti-rollover apparatus for heavy-duty vehicles with a pneumatic brake system, including the following steps:

Step A.1), $\omega_1$, $\omega_2$, $\omega_3$, and $\omega_4$ are enabled to be preset first, second, third, and fourth yaw velocity thresholds, respectively, and $\omega_1$ and $\omega_2$ are enabled to be negative values. $\omega_3=-\omega_2$, $\omega_4=-\omega_1$, and $\omega_4>\omega_3$. A signal $\omega$ of the yaw velocity sensor is collected by the electronic control unit (ECU), and compared with $\omega_1$, cot, $\omega_3$, and $\omega_4$, respectively.

Step A.2.1), if $\omega$ is positive and has a value greater than $\omega_3$ and less than $\omega_4$, Step A.2.1.1), the linear actuator is controlled by the electronic control unit (ECU) to push the brake valve; and Step A.2.1.2), the switch solenoid valve of the second brake unit is controlled by the electronic control unit (ECU) to open, and the switch solenoid valves of the first, third, and fourth brake units are controlled by the electronic control unit (ECU) to close. A high-pressure gas enters the brake chamber of the second brake unit, the front right wheel is subject to a braking force to generate an anti-yaw torque, and the yaw stability of the heavy-duty vehicle is improved.

Step A.2.2), if $\omega$ is positive and has a value greater than $\omega_4$,

Step A.2.2.1), the linear actuator is controlled by the electronic control unit (ECU) to push the brake valve; and Step A.2.2.2), the switch solenoid valves of the second and fourth brake units are controlled by the electronic control unit (ECU) to open, and the switch solenoid valves of the first and third brake units are controlled by the electronic control unit (ECU) to close. A high-pressure gas enters the brake chambers of the second and fourth brake units, the front right wheel and the rear right wheel are subject to braking forces to generate anti-yaw torques, and the yaw stability of the heavy-duty vehicle is improved.

Step A.2.3), if $\omega$ is negative and has a value less than $\omega_2$ and greater than $\omega_1$, Step A.2.3.1), the linear actuator is controlled by the electronic control unit (ECU) to push the brake valve; and Step A.2.3.2), the switch solenoid valve of the first brake unit is controlled by the electronic control unit (ECU) to open, and the switch solenoid valves of the second, third, and fourth brake units are controlled by the electronic control unit (ECU) to close. A high-pressure gas enters the brake chamber of the first brake unit, the front left wheel is subject to a braking force to generate an anti-yaw torque, and the yaw stability of the heavy-duty vehicle is improved.

Step A.2.4), if $\omega$ is negative and has a value less than $\omega_1$,

Step A.2.4.1), the linear actuator is controlled by the electronic control unit (ECU) to push the brake valve; and Step A.2.4.2), the switch solenoid valves of the first and third brake units are controlled by the electronic control unit (ECU) to open, and the switch solenoid valves of the second and fourth brake units are controlled by the electronic control unit (ECU) to close. A high-pressure gas enters the brake chambers of the first and third brake units, the front left wheel and the rear left wheel are subject to braking forces to generate anti-yaw torques, and the yaw stability of the heavy-duty vehicle is improved.

Figure 3:
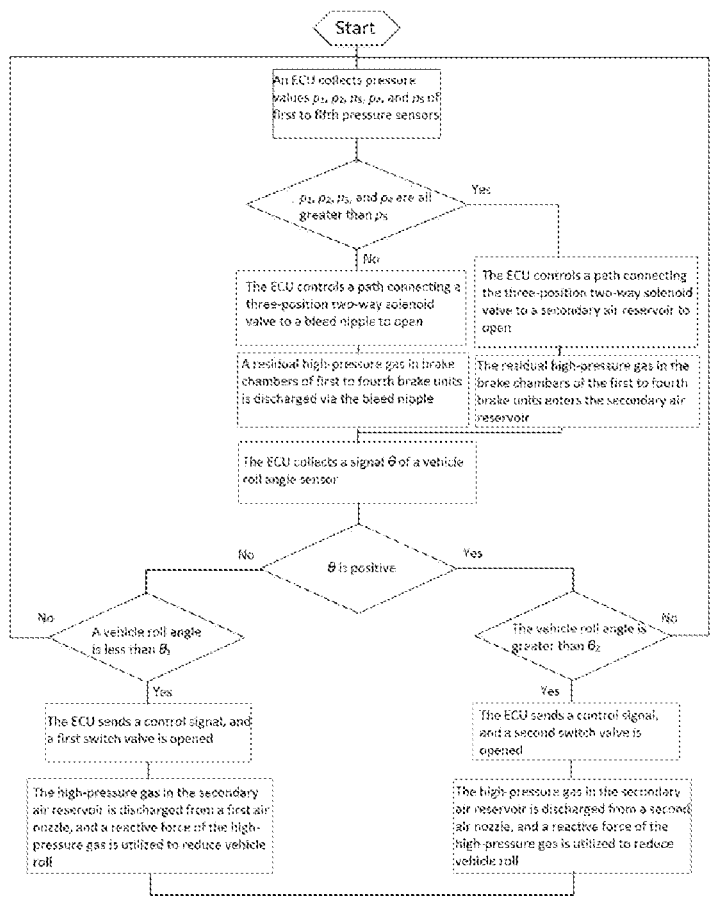
FIG. 3 is a working principle diagram of an anti-roll module of the present invention.

As shown in FIG. 3, the present invention further discloses an anti-roll method of the anti-rollover apparatus for heavy-duty vehicles with a pneumatic brake system, including the following steps:

Step B.1), when a brake is released while the heavy-duty vehicle is running, pressure values $p_1$, $p_2$, $p_3$, $p_4$, and $p_5$ of the first to fifth pressure sensors are collected by the electronic control unit (ECU), and $p_5$ is compared with $p_1$, $p_2$, $p_3$, and $p_4$, respectively.

Step B.1.1), if $p_5$ is less than any one of $p_1$, $p_2$, $p_3$, and $p_4$, the three-position two-way solenoid valve is controlled by the electronic control unit (ECU) to operate, so as to enable the brake chambers of the first to fourth brake units to be communicated with the secondary air reservoir, and enable high-pressure gases in the brake chambers of the first to fourth brake units to enter the secondary air reservoir via the three-position two-way solenoid valve.

Step B.1.2), if $p_1$, $p_2$, $p_3$, and $p_4$ are all greater than or equal tops, the three-position two-way solenoid valve is controlled by the electronic control unit (ECU) to operate, so as to enable the brake chambers of the first to fourth brake units to be communicated with the bleed nipple, and enable the high-pressure gases in the brake chambers of the first to fourth brake units to be discharged via the bleed nipple.

Step B.2), $\theta_1$ and $\theta_2$ are enabled to be preset first and second roll angle thresholds, respectively. $\theta_1$ is a negative value, and $\theta_2=-\theta_1$. A signal $\theta$ of the roll angle sensor is collected by the electronic control unit (ECU) and compared with $\theta_1$ and $\theta_2$, respectively.

Step B.3.1), if $\theta$ is positive and has a value greater than $\theta_2$,

Step B.3.1.1), the second switch valve is controlled by the electronic control unit (ECU) to open and the first switch valve is controlled by the electronic control unit (ECU) to close. A high-pressure gas in the secondary air reservoir is sprayed out from the second air nozzle, and a vehicle roll angle is reduced.

Step B.3.1.2), when $\theta$ is less than $\theta_2$, the second switch valve is controlled by the electronic control unit (ECU) to close to stop the air spraying.

Step B.3.2), if $\theta$ is negative and has a value less than $\theta_1$,

Step B.3.2.1), the first switch valve is controlled by the electronic control unit (ECU) to open and the second switch valve is controlled by the electronic control unit (ECU) to close. The high-pressure gas in the secondary air reservoir is sprayed out from the first air nozzle, and the vehicle roll angle is reduced.

Step B.3.2.2), when $\theta$ is greater than $\theta_1$, the second switch valve is controlled by the electronic control unit (ECU) to close to stop the air spraying.

Those skilled in the art can understand that, all terms (including technical and scientific terms) used herein have the same meaning as commonly understood by those of ordinary skill in the art to which the present invention belongs, unless otherwise defined. It should also be understood that terms, such as those defined in general-purpose dictionaries, should be interpreted as having a meaning that is consistent with their meaning in the context of the prior art, and will not be interpreted in an idealized or overly formal sense unless defined as herein.

The specific implementations described above further describe the objectives, technical solutions and beneficial effects of the present invention in detail. It should be understood that the above description is only specific implementations of the present invention, and is not intended to limit the present invention. Any modification, equivalent replacement, improvement, etc. made within the spirit and principle of the present invention shall fall within the protection scope of the present invention.

The invention claimed is:

1. An anti-rollover apparatus for heavy-duty vehicles with a pneumatic brake system, comprising an anti-yaw module, an anti-roll module, an electronic control unit (ECU), a yaw velocity sensor, and a vehicle roll angle sensor, wherein the anti-yaw module comprises a primary air reservoir, a brake valve, a linear actuator, a relay valve, an air compressor, and first to fourth brake units;

the first to fourth brake units are arranged at front left, front right, rear left, and rear right wheels of the heavy-duty vehicle, respectively, and each comprises a switch solenoid valve and a brake chamber, wherein the brake chamber is configured to brake a wheel at a location of the brake chamber;

the brake chambers of the first and second brake units are connected to an output end of a lower cavity of the brake valve via pipes; and the switch solenoid valves of the first and second brake units are arranged in pipes between the brake chambers of the first and second brake units and the output end of the lower cavity of the brake valve, respectively, and are configured to control connection and disconnection of the pipes between the brake chambers of the first and second brake units and the lower cavity of the brake valve;

input ends of an upper cavity and the lower cavity of the brake valve are both connected to an output end of the primary air reservoir via pipes, and an output end of the upper cavity of the brake valve is connected to an input end of the relay valve via a pipe;

an output end of the relay valve is connected to the brake chambers of the third and fourth brake units via pipes, respectively; and the switch solenoid valves of the third and fourth brake units are arranged in pipes between the brake chambers of the third and fourth brake units and the output end of the relay valve, respectively, and are configured to control connection and disconnection of the pipes between the brake chambers of the third and fourth brake units and the relay valve, respectively;

an output shaft of the linear actuator abuts against a stem seat of the brake valve, and is configured to push the stem seat of the brake valve so as to open the brake valve when extended, and when the output shaft of the linear actuator is retracted, the stem seat of the brake valve is reset and automatically closed under the effect of a return spring of the stem seat;

an output end of the air compressor is connected to an input end of the primary air reservoir via a pipe, and is configured to compress air and then feed the compressed air to the primary air reservoir, so as to enable a pressure of the primary air reservoir to be equal to a preset working pressure threshold;

the anti-roll module comprises first to fifth pressure sensors, a secondary air reservoir, a three-position two-way solenoid valve, a bleed nipple, first to second switch valves, and first to second air nozzles;

the first to fifth pressure sensors are arranged in the brake chambers of the first to fourth brake units and the secondary air reservoir, respectively, and are configured to sense pressure values at locations of the pressure sensors and transmit the pressure values to the electronic control unit (ECU);

an input end of the secondary air reservoir is connected to one output end of the three-position two-way solenoid valve via a pipe, and an output end of the secondary air reservoir is connected to the first and second air nozzles via pipes, respectively; and the first and second switch valves are arranged in pipes between the secondary air reservoir and the first and second air nozzles, respectively, and are configured to control connection and disconnection of the pipes between the secondary air reservoir and the first and second air nozzles, respectively;

an input end of the three-position two-way solenoid valve is connected to the brake chambers of the first to fourth brake units via pipes, respectively, and the other output end of the three-position two-way solenoid valve is connected to the bleed nipple via a pipe;

the first and second air nozzles are arranged in the middle of a frame on a located side of the first and second brake units of the heavy-duty vehicle, respectively, and are configured to spray air to the outer side of the heavy-duty vehicle; and the bleed nipple is configured to discharge gases entering the bleed nipple into the air;

the yaw velocity sensor is configured to detect a yaw velocity of a body of the heavy-duty vehicle and transmit the yaw velocity to the electronic control unit (ECU);

the vehicle roll angle sensor is configured to detect the magnitude of a roll angle of the heavy-duty vehicle, and transmit the magnitude of the roll angle to the electronic control unit (ECU); and the electronic control unit (ECU) is electrically connected to the first to fifth pressure sensors, the switch solenoid valves of the first to fourth brake units, the linear actuator, the three-position two-way solenoid valve, and the first to second switch valves, respectively, and is configured to control the switch solenoid valves of the first to fourth brake units, the linear actuator, the three-position two-way solenoid valve, and the first to second switch valves to operate according to sensing values of the first to fifth pressure sensors.

2. An anti-yaw method based on the anti-rollover apparatus for heavy-duty vehicles with a pneumatic brake system according to claim 1, comprising the following steps:

step A.1), enabling $\omega_1$, $\omega_2$, $\omega_3$, and $\omega_4$ to be preset first, second, third, and fourth yaw velocity thresholds, respectively, and $\omega_1$ and $\omega_2$ to be negative values, wherein $\omega_3=-\omega_2$, $\omega_4=-\omega_1$, and $\omega_4>\omega_3$; and collecting, by the electronic control unit (ECU), a signal $\omega$ of the yaw velocity sensor, and comparing the signal with $\omega_1$, $\omega_2$, $\omega_3$, and $\omega_4$, respectively;

step A.2.1), if $\omega$ is positive and has a value greater than 613 and less than $\omega_4$, step A.2.1.1), controlling, by the electronic control unit (ECU), the linear actuator to push the brake valve; and step A.2.1.2), controlling, by the electronic control unit (ECU), the switch solenoid valve of the second brake unit to open, and the switch solenoid valves of the first, third, and fourth brake units to close, wherein a high-pressure gas enters the brake chamber of the second brake unit, the front right wheel is subject to a braking force to generate an anti-yaw torque, and the yaw stability of the heavy-duty vehicle is improved;

step A.2.2), if $\omega$ is positive and has a value greater than $\omega_4$, step A.2.2.1), controlling, by the electronic control unit (ECU), the linear actuator to push the brake valve; and step A.2.2.2), controlling, by the electronic control unit (ECU), the switch solenoid valves of the second and fourth brake units to open, and the switch solenoid valves of the first and third brake units to close, wherein a high-pressure gas enters the brake chambers of the second and fourth brake units, the front right wheel and the rear right wheel are subject to braking forces to generate anti-yaw torques, and the yaw stability of the heavy-duty vehicle is improved;

step A.2.3), if ω is negative and has a value less than $\omega_2$ and greater than $\omega_1$, step A.2.3.1), controlling, by the electronic control unit (ECU), the linear actuator to push the brake valve; and step A.2.3.2), controlling, by the electronic control unit (ECU), the switch solenoid valve of the first brake unit to open, and the switch solenoid valves of the second, third, and fourth brake units to close, wherein a high-pressure gas enters the brake chamber of the first brake unit, the front left wheel is subject to a braking force to generate an anti-yaw torque, and the yaw stability of the heavy-duty vehicle is improved; and step A.2.4), if ω is negative and has a value less than $\omega_1$, step A.2.4.1), controlling, by the electronic control unit (ECU), the linear actuator to push the brake valve; and step A.2.4.2), controlling, by the electronic control unit (ECU), the switch solenoid valves of the first and third brake units to open, and the switch solenoid valves of the second and fourth brake units to close, wherein a high-pressure gas enters the brake chambers of the first and third brake units, the front left wheel and the rear left wheel are subject to braking forces to generate anti-yaw torques, and the yaw stability of the heavy-duty vehicle is improved.

3. An anti-roll method based on the anti-rollover apparatus for heavy-duty vehicles with a pneumatic brake system according to claim 1, comprising the following steps:

step B.1), when a brake is released while the heavy-duty vehicle is running, collecting, by the electronic control unit (ECU), pressure values $p_1$, $p_2$, $p_3$, $p_4$, and $p_5$ of the first to fifth pressure sensors, and comparing $p_5$ with $p_1$, $p_2$, $p_3$, and $p_4$, respectively;

step B.1.1), if $p_5$ is less than any one of $p_1$, $p_2$, $p_3$, and $p_4$, controlling, by the electronic control unit (ECU), the three-position two-way solenoid valve to operate, so as to enable the brake chambers of the first to fourth brake units to be communicated with the secondary air reservoir, and enable high-pressure gases in the brake chambers of the first to fourth brake units to enter the secondary air reservoir via the three-position two-way solenoid valve; and step B.1.2), if $p_1$, $p_2$, $p_3$, and $p_4$ are all greater than or equal tops, controlling, by the electronic control unit (ECU), the three-position two-way solenoid valve to operate, so as to enable the brake chambers of the first to fourth brake units to be communicated with the bleed nipple, and enable the high-pressure gases in the brake chambers of the first to fourth brake units to be discharged via the bleed nipple;

step B.2), enabling $\theta_1$ and $\theta_2$ to be preset first and second roll angle thresholds, respectively, wherein $\theta_1$ is a negative value, and $\theta_2 = -\theta_1$; and collecting, by the electronic control unit (ECU), a signal θ of the roll angle sensor, and comparing the signal with $\theta_1$ and $\theta_2$, respectively;

step B.3.1), if θ is positive and has a value greater than $\theta_2$, step B.3.1.1), controlling, by the electronic control unit (ECU), the second switch valve to open and the first switch valve to close, wherein a high-pressure gas in the secondary air reservoir is sprayed out from the second air nozzle, and a vehicle roll angle is reduced; and step B.3.1.2), when θ is less than $\theta_2$, controlling, by the electronic control unit (ECU), the second switch valve to close to stop the air spraying; and step B.3.2), if θ is negative and has a value less than $\theta_1$, step B.3.2.1), controlling, by the electronic control unit (ECU), the first switch valve to open and the second switch valve to close, wherein the high-pressure gas in the secondary air reservoir is sprayed out from the first air nozzle, and the vehicle roll angle is reduced; and step B.3.2.2), when θ is greater than $\theta_1$, controlling, by the electronic control unit (ECU), the second switch valve to close to stop the air spraying.

\* \* \* \* \*